(12) United States Patent
Kanervo et al.

(10) Patent No.: US 10,968,398 B2
(45) Date of Patent: Apr. 6, 2021

(54) METHOD FOR PRODUCING KETONES FOR FUEL AND OIL APPLICATIONS

(71) Applicant: Neste Oyj, Espoo (FI)

(72) Inventors: Jaana Kanervo, Porvoo (FI); Sami Toppinen, Porvoo (FI); Pekka Nurmi, Porvoo (FI)

(73) Assignee: NESTE OYJ, Espoo (FI)

( * ) Notice: Subject to any disclaimer, the term of this patent is extended or adjusted under 35 U.S.C. 154(b) by 142 days.

(21) Appl. No.: 16/222,776

(22) Filed: Dec. 17, 2018

(65) Prior Publication Data

US 2019/0185759 A1  Jun. 20, 2019

(30) Foreign Application Priority Data

Dec. 19, 2017 (FI) .................................... 20176135

(51) Int. Cl.
| | |
|---|---|
| *C07C 45/41* | (2006.01) |
| *C07C 45/54* | (2006.01) |
| *C10G 3/00* | (2006.01) |
| *B01D 19/00* | (2006.01) |
| *B01J 21/06* | (2006.01) |
| *C10L 1/02* | (2006.01) |
| *C10L 1/185* | (2006.01) |
| *B01J 23/04* | (2006.01) |
| *C10M 105/20* | (2006.01) |

(52) U.S. Cl.
CPC ........... *C10G 3/50* (2013.01); *B01D 19/0068* (2013.01); *B01J 21/063* (2013.01); *B01J 23/04* (2013.01); *C10G 3/44* (2013.01); *C10L 1/026* (2013.01); *C10L 1/1857* (2013.01); *C10M 105/20* (2013.01); *B01D 2257/504* (2013.01); *B01J 2523/22* (2013.01); *B01J 2523/23* (2013.01); *B01J 2523/47* (2013.01); *B01J 2523/48* (2013.01); *C10G 2300/1011* (2013.01); *C10G 2300/4081* (2013.01); *C10G 2400/04* (2013.01); *C10L 2270/026* (2013.01); *C10M 2207/085* (2013.01)

(58) Field of Classification Search
CPC ........... C07C 45/41; C07C 45/54; C10G 3/44; C10G 3/50; C10L 1/026
See application file for complete search history.

(56) References Cited

U.S. PATENT DOCUMENTS

| | | |
|---|---|---|
| 1,941,640 A | 1/1934 | Tressler |
| 6,307,106 B1 | 10/2001 | Oost et al. |
| 9,120,713 B2* | 9/2015 | Kettunen ................. B01J 23/04 |
| 2013/0310608 A1 | 11/2013 | Barnicki et al. |
| 2013/0324449 A1 | 12/2013 | Hommeltoft et al. |
| 2017/0362154 A1 | 12/2017 | Kettunen et al. |

FOREIGN PATENT DOCUMENTS

| | | |
|---|---|---|
| EP | 3 012 310 A1 | 4/2016 |
| GB | 844620 | 8/1960 |
| WO | 2007/068795 A1 | 6/2007 |
| WO | 2007/068799 A2 | 6/2007 |

OTHER PUBLICATIONS

The extended European Search Report dated Apr. 4, 2015, by the European Patent Office in corresponding European Application No. 18212327.3. (8 pages).

* cited by examiner

*Primary Examiner* — Sikarl A Witherspoon
(74) *Attorney, Agent, or Firm* — Buchanan Ingersoll & Rooney PC

(57) ABSTRACT

A method and system for producing ketones, suitable for manufacture of base oil or diesel fuel components, from a feedstock of biological origin containing fatty acids and/or fatty acid derivatives, and being at least partly in liquid form, by subjecting the feedstock to a catalytic ketonisation reaction, wherein the ketonisation reaction is carried out in a system having one or more ketonisation reactor(s) (A', B') each with at least one ketonisation catalyst bed (G'). The method and system for producing ketones use a gas containing $CO_2$ produced in the ketonisation reactors as a carrier gas.

32 Claims, 2 Drawing Sheets

METHOD FOR PRODUCING KETONES FOR FUEL AND OIL APPLICATIONS

TECHNICAL FIELD

The present invention relates to the field of fuel and base oil production. More specifically the invention relates to a method for producing ketones from a feedstock of biological origin comprising fatty acids and/or fatty acid derivatives in a system comprising one or more ketonisation reactors and use of the ketones for the manufacture of fuel and base oil components.

BACKGROUND

Base oils find use for modern engine lubrication technologies. High-quality base oil should enable engines to deliver high-level performance and power without compromising fuel economy or environmental standards, and there is a need for renewable sources in the production of base oils and lubricants. Oils from biomass contain free fatty acids and/or triglycerides, however, the hydrocarbons' chain lengths in the fatty acids are too short for base oils with the qualities wished for.

Ketonisation by combining two fatty acids to form a long-chain ketone is an appropriate reaction route for formation of suitable long-chain hydrocarbons applicable also as base oil or diesel fuel components. The long chain ketones can readily be hydrogenated to yield straight chain hydrocarbons. These hydrocarbons in turn can be further isomerized to produce various base oil or diesel fuel components. The route is based on the following reaction scheme:

Fatty acid+Fatty acid=>Ketone+CO$_2$+H$_2$O   (ketonisation reaction)

Ketone+2H$_2$=>n-Parafin+H$_2$O   (hydrodeoxygenation reaction)

n-Parafin=>i-Parafin   (isomerisation reaction)

Thus, ketonisation may be the first step in e.g. base oil production technology, and it is conducted over a suitable catalyst for the ketonisation process. Base oil production technology including the use of a ketonisation reaction is disclosed e.g. in WO 2007/068795, which is incorporated herein for reference.

The ketonisation step is a critical step in the overall process both for the material and energy efficiency of the process, since the ketone product is subject to further catalytic conversions, such as hydrodeoxygenation and isomerisation, prior to appliance in e.g. base oil. The ketonisation step is sensitive to the reactor temperature and it is an endothermic reaction (viz. consumes energy), and vaporisation of certain components, in particular H$_2$O and CO$_2$, further decreases the reactor temperature leading to an adverse effect on the ketonisation process. A full scale plant is typically operated at slightly lower temperatures compared to optimal temperature for practical reasons. However, operation at a lower temperature than the optimum requires as compensation a larger amount of catalyst which on its side increases the production of unwanted, heavy by-products, such as trimers.

Furthermore, the water produced during the ketonisation reaction inhibits the ketonisation process.

Finally, the ketonisation reaction requires the use of a catalyst bed. Gas evolution/generation from the ketonisation reaction may cause problems at the catalyst bed due to uneven liquid flows through the catalyst beds, whereby the reaction is further negatively influenced.

Therefore, there is a need for enhancing the ketonisation step in the base oil production with the aim of reducing the disadvantageous effects of the endothermic reaction and the water production.

US 2013/0310608 discloses a process for reducing the emission of volatile organic compounds that are produced during the ketonisation of acetic acid to acetone. The ketonisation produces a gaseous by-product stream containing carbon dioxide and volatile organic compounds. This gaseous by-product stream can be fed to a direct-fired furnace used to heat the ketonisation reaction feed streams where the volatile organic compounds are destroyed by combustion in the furnace. The carbon dioxide stream further acts as a diluent for the fuel to the furnace.

US 2017/324449 discloses a process for producing ketones or hydrocarbons base oil from fatty acids, preferably derived from a biological origin. The ketonisation reaction is performed in vapour phase in a decarboxylation-coupling zone wherein the temperature is between 20 and 100° C. above the condensation point of the fatty acid at the partial pressure of the fatty acid in the decarboxylation-coupling zone U.S. Pat. No. 6,307,106 discloses a catalytic process for preparing lower unsaturated ketones by reacting the corresponding alpha-beta-unsaturated alcohols with alkyl acetoacetate, and a suitable reactor system for the reaction.

The object of the present invention is to provide an improved method for producing ketones suitable for manufacture of base oil or diesel components from a feedstock of biological origin.

Another object is to provide a method for producing ketones suitable for manufacture of base oil or diesel components wherein the adverse effects on the ketonisation reaction of the endothermic temperature drop are handled so as to maintain the reactor temperature within acceptable ranges and to maintain low water concentration in the liquid phase in the reactor.

Yet another object is to provide a method enabling a high yield of ketone with high fatty acids utilisation without compromising the quality of the base oil or diesel fuel component.

These objects are fulfilled with the method of the present invention.

SUMMARY OF THE INVENTION

Accordingly, the present invention relates in a first aspect to a method for producing ketones, suitable for manufacture of base oil or diesel fuel components, from a feedstock of biological origin comprising fatty acids and/or fatty acid derivatives, wherein the feedstock is at least partly in liquid phase, by subjecting the feedstock to a catalytic ketonisation reaction, wherein the ketonisation reaction is carried out in a system comprising one or more ketonisation reactor(s) each comprising at least one ketonisation catalyst bed, further comprising that the feedstock is introduced into a ketonisation reactor together with a carrier gas stream comprising CO$_2$;
gas comprising CO$_2$ is separated from the effluent exiting a ketonisation reactor whereby the effluent comprising ketones is used either as a feedstock for a further ketonisation reactor or for recovery of ketones from the effluent; and
the separated gas comprising CO$_2$ is recycled and used in the carrier gas stream in a ketonisation reactor.

With the present invention it is possible
To maintain the operation temperature within an acceptable range despite of the endothermic nature of the ketonisation reaction;
To have high yield for target ketone, especially by controlling the adiabatic decrease in the temperature by dividing the reactor into more than one or several units and providing intermediate heating for the units;
To increase the yield further by stripping liquid water into gas phase using carrier gas;
To avoid the need for additional separations, as the $CO_2$ formed during the ketonisation reaction may also be used as the carrier gas;
To have uniform and predictable liquid and gas flow distribution in the reactors, especially in trickle reactors, by the use of the carrier gas; and
To produce pure $CO_2$, the amount of which corresponds to the amount of gas forming in the ketonisation reaction; and
To produce hydrocarbons, such as diesel-range hydrocarbons, as side products which may be returned to the ketonisation or directed to hydro treatment.

Essentially, the process does not produce any waste, merely commercially applicable products such as ketones, diesel components and pure CO2, and water.

It has been observed that the usage of carrier gas accelerates the ketonisation reaction. This is mainly explained by the fact that the flow of carrier gas strips the formed water from the liquid phase to the gas phase side. Water dissolved in the liquid organic phase will inhibit the catalysis of the ketonisation, whereas water in the reactor gas phase—without a direct contact with the catalyst—is harmless.

It has been found in connection with the present invention that the ketonisation reaction is highly sensitive to the reaction temperature, and that the activation energy is about 160 kJ/mol. On the other hand, the energetics of ketonisation is endothermic, and the reaction enthalpy, $\Delta H$, is 30 kJ/mol. The combination of these reaction characteristics easily result in an inefficient reactor, as the adiabatic behavior with the progress of reaction will cause the reactor temperature to drop from the entrance of the reactor towards the exit of the reactor. Theoretically, it would be advantageous to run the reaction at as high temperature as possible; however the practical limitations are unavailability of economic heating media and possible decay of organic compounds at elevated temperatures.

The method of the present invention is founded on the observations that in an industrial scale reactor, the mass and heat transfer characteristics need to be upgraded by reaction engineering to improve the activity and selectivity of the ketonisation reaction. The key drivers were found to be the following:

Usage of carrier gas is required to strip the formed water during the ketonisation reaction;
Concentrated solution of reactants need to be in good contact with catalyst; and/or
Reasonably high reactant feed temperature and a good control of adiabatic temperature drop is required; and/or
Suppression of side reactions is to be achieved by avoiding excessive contact time and catalyst overloading.

Potential process configurations are numerous, whereas the preferred alternatives were found to be the ones presented with the present invention. From the energy consumption point of view, excessive temperature or pressure changes are to be avoided in order to minimize the operating expense of heat exchanger, pumping and compressor. Feasible WHSV should be low, but maximized within the yield target and other boundary conditions. The feed temperature vs. WHSV (Weight Hourly Space Velocity i.e. mass flow/catalyst mass) combination was found to be the key for tuning the yield to an acceptable level.

In the second aspect of the present invention, it relates to a system for producing ketones, suitable for manufacture of base oil components, from a feedstock of biological origin comprising fatty acids and/or fatty acid derivatives by subjecting the feedstock to a catalytic ketonisation reaction, wherein
the system comprises one or more ketonisation reactors (A', B') each comprising a ketonisation at least one catalyst bed (G'), means for heating, preferably an oil heater, inlet means for the feedstock (1') and outlet means for the effluent (2', 4') exiting a ketonisation reactor; wherein
the one or more ketonisation reactors each further comprises inlet means for carrier gas streams (5', 6'), outlet means for separated gas streams comprising $CO_2$ (8', 10'); and wherein
the system further comprises one or more gas-liquid separators (D', E') for separating $CO_2$ in the separated gas streams (8', 10') from $H_2O$ vapour, unreacted fatty acids and/or fatty acid derivatives, and/or volatile organic compounds, and means (F') for recirculating and optionally compressing the separated $CO_2$; and optionally
recycling means for liquid comprising unreacted fatty acids and/or fatty acid derivatives (11') and outlet means for separated $CO_2$ (12').

In the third aspect of the invention, it relates to the use of a gas comprising $CO_2$ as a carrier gas stream in a ketonisation reaction, wherein the gas comprising $CO_2$ has been produced in a catalytic ketonisation reaction producing ketones, suitable for manufacture of base oil components, from a feedstock of biological origin comprising fatty acids and/or fatty acid derivatives in one or more ketonisation reactors each comprising a ketonisation catalyst bed, and wherein the gas has been separated from the effluent exiting a ketonisation reactor and recycled.

In the fourth aspect of the invention it relates to the use of ketones obtainable by a method of the invention for the manufacture of base oil or base oil components.

It has also been observed that if the fatty acid is in the liquid phase, the selectivity for the target ketone is high, preferably in the range of 95 mole-%, or even higher. This may be explained by the ketonisation being a second order reaction, favored by the presence of concentrated reactant. Therefore, in one embodiment of the invention in all its aspects the feedstock is at least partly in liquid phase.

Definitions

Fatty Acids

The term fatty acid is well-known to the skilled person and as used herein characterises a carboxylic acid consisting of a hydrocarbon chain and a terminal carboxyl group, in particular any of those carboxylic acids occurring as esters in fats and oils.

Feedstock

In the context of the present invention the feedstock of biological origin is to be understood as a feedstock which comprises free fatty acids or fatty acid derivatives, such as esters, amides, aldehydes, alcohols, anhydrides, metal salts, or mixture thereof, the fatty acids having 4 or more C atoms, and suitable for the manufacture of base oil components.

Most fatty acids of plant or animal origin are straight-chain compounds, which most frequently contain an even number of carbon atoms, such as 6 to 24 C atoms, e.g. 8, 10, 12, 14, 16, 18, 20, or 22 C atoms, and usually no or only trace amounts of odd-numbered fatty acids. The fatty acid may be saturated or unsaturated. Fatty acid esters are e.g. fatty acid glycerols. The ketonisation reaction requires free fatty acids, and degraded or low-value biological oils are typically mixtures of free fatty acids and fatty acid glycerols, such as triglycerides or partial glycerides. The major part of the free fatty acids and fatty acid esters may, for example, be considered to be more than 50 wt %, such as more than 70 wt %, more than 90 wt %.

Renewable Diesel Fuel

Renewable diesel fuel in the context of the present invention is to be understood as deriving from unreacted fatty acids or ketonisation product of reacted fatty acids of biological origin which have been hydro treated into paraffins. The paraffins are typically long chain hydrocarbons which in connection with the present invention mean that the average carbon chain length is at least 7 atoms.

Renewable Base Oil

Renewable base oil in the context of the present invention is to be understood as deriving from ketonisation of fatty acids of biological origin to form ketones. The ketones are typically long chain ketones which in connection with the present invention means that the ketone average chain length is 7 or more C-atoms.

When base oil components contain carbon $^{14}C$ isotope, it is an indication of its use as renewable base oil as disclosed in WO 2007/068799 which is incorporated herein for reference.

Ketonisation Reactor

Ketonisation reactor is a continuously operated pressure vessel where ketonisation reaction is carried out over a fixed bed of ketonisation catalyst.

DETAILED DESCRIPTION OF THE INVENTION

Figure 1:
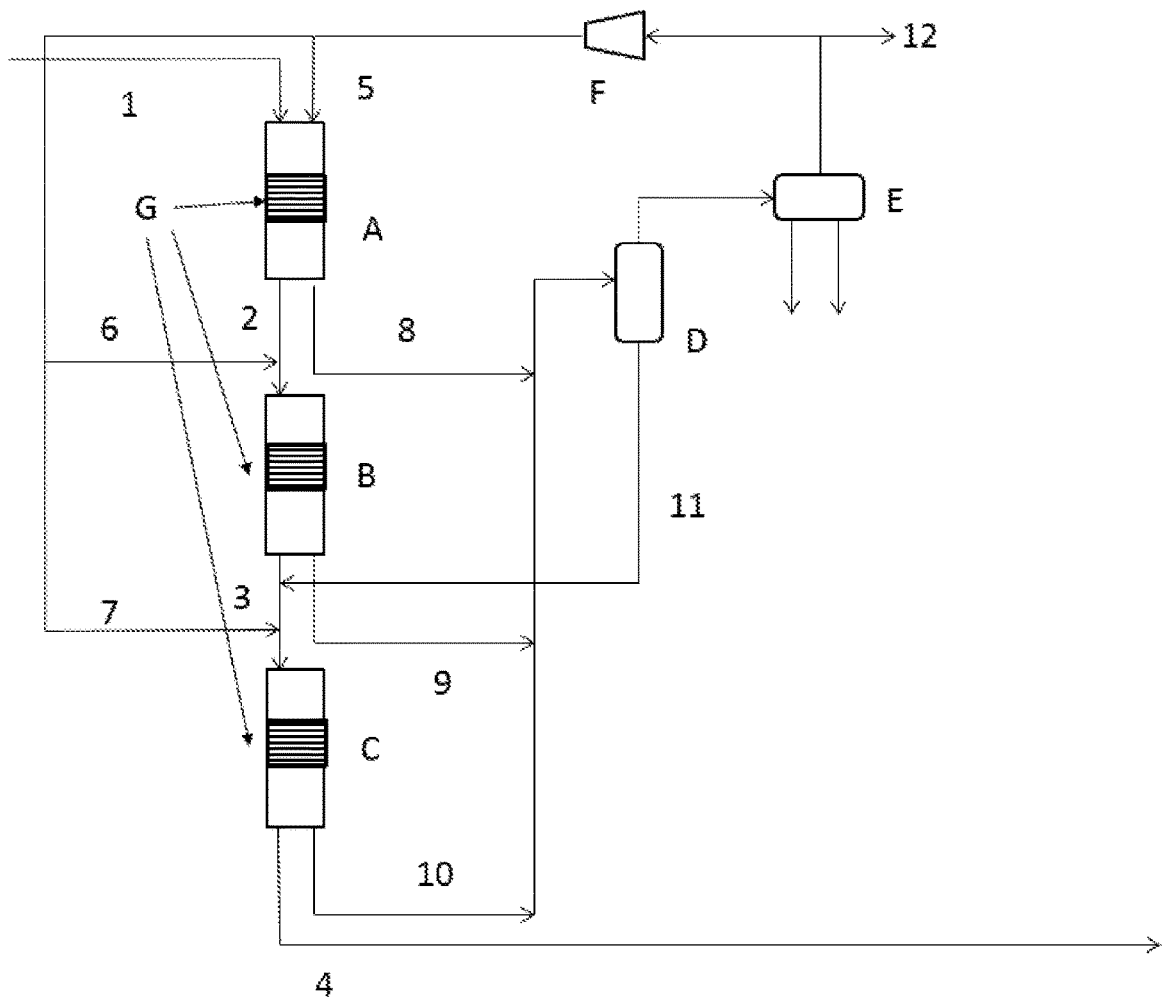
FIG. 1 shows a block diagram for a system for producing ketones according to the invention comprising three ketonisation reactors, two gas-liquid separators and a compressor.

In describing the embodiments of the invention specific terminology will be resorted to for the sake of clarity. However, the invention is not intended to be limited to the specific terms so selected, and it is understood that each specific term includes all technical equivalents which operate in a similar manner to accomplish a similar purpose.

When describing the embodiments of the present invention, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The terms "comprising", "comprise" and comprises herein are intended by the inventors to be optionally substitutable with the terms "consisting of", "consist of" and "consists of", respectively, in every instance.

By the expression ketones suitable for manufacture of base oil or diesel fuel components are meant ketones produced from fatty acid containing feed wherein the fatty acid carbon chain length is 4 or more C atoms, preferably at least 6 C atoms, resulting in a ketone comprising at least 7 C atoms, preferably at least 11 C atoms, in length when ketonised. These hydrocarbons are suitable for the manufacture of diesel fuel components having the lower carbon number range, typically from C7 to C20; and base oil components having the higher carbon number range, such as from C11 upwards.

The First Aspect of the Invention

The feedstock used according to the invention is of biological origin and comprises fatty acids and/or fatty acid derivatives, such as esters, amides, aldehydes, alcohols, anhydrides, metal salts, or mixture thereof. The fatty acid may be saturated or unsaturated, and the derivatives may for example be fatty acid esters, including glycerols selected from mono-, di-, and triglycerides, fatty acid amides and fatty alcohols.

The feedstock of biological origin may e.g. be selected from i) any kind of fats, any kind of waxes, plant fats, plant oils, plant waxes; animal fats, animal oils, animal waxes, fish fats, fish oils, fish waxes, and ii) fatty acids or free fatty acids obtained from plant fats, plant oils, plant waxes; animal fats, animal oils, animal waxes; fish fats, fish oils, fish waxes, and mixtures thereof by hydrolysis, transesterification, or pyrolysis, and iii) esters obtained from plant fats, plant oils, plant waxes; animal fats, animal oils, animal waxes; fish fats, fish oils, fish waxes, and mixtures thereof by transesterification, and iv) metal salts of fatty acids obtained from plant fats, plant oils, plant waxes; animal fats, animal oils, animal waxes; fish fats, fish oils, fish waxes, and mixtures thereof by saponification, and v) anhydrides of fatty acids from plant fats, plant oils, plant waxes; animal fats, animal oils, animal waxes; fish fats, fish oils, fish waxes, and mixtures thereof, and vi) esters obtained by esterification of free fatty acids of plant, animal, and fish origin with alcohols, and vii) fatty alcohols or aldehydes obtained as reduction products of fatty acids from plant fats, plant oils, plant waxes; animal fats, animal oils, animal waxes; fish fats, fish oils, fish waxes, and mixtures thereof, and viii) recycled food grade fats and oils, and fats, oils and waxes obtained by genetic engineering, ix) dicarboxylic acids or polyols including diols, hydroxyketones, hydroxyaldehydes, hydroxycarboxylic acids, and corresponding di- or multifunctional sulphur compounds, corresponding di- or multifunctional nitrogen compounds, x) compounds derived from algae, xi) mixtures of said feeds of biological origin.

In a first embodiment of this aspect of the invention the feedstock is at least partly in liquid phase. Preferably, the feedstock is at least 60 wt-% in liquid phase, preferably at least 65 wt-%, more preferably at least 70 wt-%, at least 75 wt-%, at least 80 wt-%, or at least 90 wt-% in liquid phase, and most preferred 100 wt-% in liquid phase.

In a second embodiment the feedstock of biological origin may comprise saturated free fatty acids and/or saturated fatty acid derivatives, such as esters, amides, aldehydes, alcohols, anhydrides, metal salts, or mixture thereof, preferably fatty acid glycerols.

In any of the above embodiments the feedstock of biological origin may comprise saturated free fatty acids and/or saturated fatty acid esters having an average carbon chain length of from $C_4$ to $C_{24}$, preferably having an average carbon chain length of from $C_6$ to $C_{24}$.

In any of the above embodiments in the ketonisation reaction the ketonisation catalyst bed may comprise a ketonisation catalyst which is a metal oxide catalyst. Typical metals include Na, Mg, K, Ca, Sc, Cr, Mn, Fe, Co, Ni, Cu, Ti, Sr, Y, Zr, Mo, Rh, Cd, Sn, La, Pb, Bi and rare earth metals. Preferably, the metals are selected from the list consisting of one or more of: Ti, Mn, Mg, Ca, and Zr containing metal oxide catalyst, most preferably the ketonisation catalyst is a Ti containing metal oxide catalyst. The metal oxides may be on a support. Typical supports are laterite, bauxite, titanium dioxide, silica and/or aluminium oxide.

In designing and controlling the ketonisation performance at the catalyst beds inside the ketonisation reactors, the most important parameters to control are the WHSV, viz. catalyst loading, and the feedstock temperature.

Thus, in any of the above embodiments the temperature in the feedstock may be selected as at least 330° C., preferably at least 340° C., more preferably at least 350° C., most preferably at least 355° C., and most preferred 360-365° C., in particular if the carbon number of the feed is 6 or more.

In any of the above embodiments the liquid feed flow rate, WHSV, may be selected from 0.1 to 10 $h^{-1}$, preferably from 0.2 to 5 $h^{-1}$, more preferably from 0.3 to 3 $h^{-1}$, most preferably from 0.5 to 1 $h^{-1}$.

In any of the above embodiments the pressure in a ketonisation reactor may be selected as at least 1000 kPa, preferably at least 1200 kPa, more preferably at least 1300 kPa, even more preferably at least 1500 kPa, most preferably at least 2000 kPa, or most preferred at least 2500 kPa. When the pressure is from 500 to 5000 kPa, major part of the acid is in liquid form. For enhancing the base oil formation the pressure is preferably from 1500-2000 bar, whereas for the diesel fuel component a pressure from 1000 to 5000 kPa is applicable.

In a particular embodiment of any of the above embodiments the ketonisation reaction is carried out in a system comprising two or more ketonisation reactors in series each comprising a ketonisation catalyst bed; further comprising that the feedstock is introduced into the first ketonisation reactor together with a first carrier gas stream comprising $CO_2$; and the gas comprising $CO_2$ is separated from the effluent exiting the first ketonisation reactor whereby the effluent is introduced into the second ketonisation reactor together with a second carrier gas stream comprising $CO_2$; and if the system comprises more than two ketonisation reactors, the gas comprising $CO_2$ is separated from the effluent exiting each ketonisation reactor leaving a degassed effluent which is subsequently introduced into the next ketonisation reactor together with a further carrier gas stream comprising $CO_2$;

gas comprising $CO_2$ is separated from the effluent exiting the final ketonisation reactor whereby the effluent comprising ketones is used for recovery; and the separated gas streams comprising $CO_2$ are recycled and used as the carrier gas stream in one or more of the ketonisation reactor(s).

In this embodiment, wherein the ketonisation reactors are arranged in series, the pressure in each ketonisation reactor following the first ketonisation reactor may be adjusted to be lower than the pressure in the preceding ketonisation reactor. By selecting the pressures in a decreasing series, the pressure difference drives the liquid stream without pumping.

In this embodiment, wherein the ketonisation reactors are arranged in series, the catalyst loading in the catalyst bed in each ketonisation reactor following the first ketonisation reactor is higher than the catalyst loading in the first ketonisation reactor, preferably at least 50% higher. This measurement helps to control the adiabatic temperature decrease in ketonisation and makes operation more cost efficient. The catalyst loading is e.g. preferably at least 10% higher in the second reactor, and/or preferably at least 50% higher in the third reactor, if three reactors are included in the series.

In any of the above embodiments the ketonisation system may comprise at least two ketonisation reactors, and the effluent exiting a ketonisation reactor and separated from gas comprising $CO_2$ may be heated before introduction into a subsequent ketonisation reactor.

In any of the above embodiments separated gas streams comprising $CO_2$ may be purified before recycling and recovered in a separation process comprising steps of separating $CO_2$ and $H_2O$ vapour from unreacted fatty acids, fatty acids derivatives and volatile organic compounds, and/or separating substantially pure $CO_2$, such as at least 98% pure, preferably 99% pure $CO_2$, more preferably 99.5%, most preferably 99.9% pure $CO_2$, from the waste water, and the unreacted fatty acids and fatty acids derivatives are optionally recycled to a ketonisation reactor.

The purification of the $CO_2$ before re-feeding it to the reactor makes the gas dry and enhances ketonisation reaction rate and also assists in avoiding enrichment of other light products in the recycle loop.

In any of the above embodiments separated gas comprising $CO_2$ may be subjected to purification, such as by cooling, and optionally further purification, and/or the recovered purified gas may dried before recycling it to a ketonisation reactor.

In any of the above embodiments substantially pure $CO_2$ may be recovered and subjected to compression, optionally under heating, before recycling it to a ketonisation reactor.

In any of the above embodiments the heat generated by the cooling may be used for compression under heating of the substantially pure $CO_2$ In any of the above embodiments the method may further comprise a hydrodeoxygenation step, an optional isomerisation step, and optional hydrofinishing steps. The hydrodeoxygenation step is required if base oil components are to be produced.

The Hydrodeoxygenation and Isomerisation

The hydrodeoxygenation step, and isomerisation step, if applied, may either be done simultaneously or in sequence. The product is a deoxygenated and optionally isomerised base oil stream comprising renewable base oil.

The hydrodeoxygenation reaction is done in the presence of hydrogen gas and may be performed in the presence of a hydrodeoxygenation catalyst, such as CoMo, NiMo, NiW, CoNiMo on a support, for example an alumina support, zeolite support, or a mixed support. The hydrodeoxygenation step may for example be conducted at a temperature in the range from 250 to 400° C., and at a pressure in the range from 20 to 80 barg, a WHSV in the range from 0.5 to 3 h−1, and a $H_2$/oil ratio of 350-900 nl/l, using a catalyst, such as NiMo, optionally on a alumina support.

The product of the hydrodeoxygenation step may be subjected to an isomerization step in the presence of hydrogen and an isomerization catalyst. The isomerisation catalyst may be a noble metal bifunctional catalyst such as a for example Pt-SAPO or Pt-ZSM-catalyst or NiW. The isomerization step may for example be conducted at a temperature of 250-400° C. and at a pressure of 10-60 barg. The isomerisation step may for example be conducted at a temperature of 250-400° C., at a pressure of between 10 and 60 barg, a WHSV of 0.5-3 h−1, and a H2/oil ratio of 100-800 nl/l.

The hydrodeoxygenation and hydroisomerisation steps may be done in a single step on the same catalyst bed using a single catalyst for this combined step, e.g. NiW, or a Pt catalyst, such as Pt/SAPO in mixture with a Mo catalyst on a support, e.g. NiMo on alumina.

Hydrofinishing

In the hydrofinishing step, if applied, the product is stabilised by a further hydrogenation step. The hydrofinishing step may be applied to stabilise the product and involves e.g. hydrogenation of double bonds or aromatic compounds that are present after the ketonisation reaction and the following, optional, hydrodeoxygenation and isomerisation steps. The hydrofinishing step may be conducted at a temperature below 300° C., and a pressure between 100 and 200 barg. The WHSV may for example be 0.5-3.0 h−1, and the $H_2$/oil ratio may for example be 100-500 nl/l.

The Second Aspect of the Invention

In a first embodiment of this aspect of the invention it may further comprise means for purifying the separated $CO_2$ to a substantially pure $CO_2$ gas, preferably at least 98% pure, more preferably 99% pure, even more preferably 99.5% pure, most preferably 99.9% pure $CO_2$.

In a second embodiment the system according to the present invention may comprise two, three or four ketonisation reactors, preferably in series.

In any of these embodiments the system may comprise three ketonisation reactors (A, B, C), preferably in series, each comprising one or more ketonisation catalyst bed(s) (G), means for heating, inlet means for the feedstock (1) and outlet means for the effluent (2, 3, 4) exiting a ketonisation reactor; wherein the three ketonisation reactors each further comprises inlet means for a carrier gas stream (5, 6, 7), outlet means for separated gas streams comprising $CO_2$ (8, 9, 10); and wherein the system further comprises one or more gas-liquid separators (D, E) for separating $CO_2$ in the separated gas streams (8, 9, 10) from $H_2O$ vapour, unreacted fatty acids and/or fatty acid derivatives, and/or volatile organic compounds, and means (F) for recirculating and optionally compressing the separated $CO_2$; and optionally recycling means for liquid comprising unreacted fatty acids and/or fatty avid derivatives (11) and outlet means for separated $CO_2$ (12).

In any of these embodiments one or more ketonisation reactor(s) is a trickle bed reactor.

In any of these embodiments the system may further comprise means for purification of gas comprising $CO_2$, such as means for separation $CO_2$ and/$H_2O$ vapour from volatile organic compounds.

The Third Aspect of the Invention

In a first embodiment of this aspect the use of a gas comprising $CO_2$ as a carrier gas stream have the effect of enhancing the gas flow within a ketonisation reactor comprising a ketonisation catalyst bed wherein a feedstock of biological origin comprising fatty acids and/or fatty acid derivatives is subjected to a ketonisation reaction. By "enhancing" is meant that a more uniform gas flow pattern is allowed throughout the reaction zone. As the reactor has both $CO_2$ recycle gas and a liquid feedstock phase present in the reactor inlet, there will be a continuous gas flow through the reactor. This will prevent maldistribution of concentration gradients typically due in single phase reactor with gas evolution during reaction.

In a second embodiment of this aspect, and before recycling, the separated gas comprising $CO_2$ has been purified and recovered in a separation process comprising steps of separating $CO_2$ from $H_2O$ vapour and/or volatile organic compounds and optionally separated as substantially pure $CO_2$ from the waste water. Part of $CO_2$ may be retrieved as a product before recycling. This $CO_2$ is quite pure.

In any of the above embodiments separated gas comprising $CO_2$ has been subject to purification, e.g. by cooling, an optionally further purification, and/or the recovered purified gas has been dried before recycling to a ketonisation reactor.

In any of the above embodiments substantially pure $CO_2$ has been recovered and subjected to compression, optionally under heating, before recycled to a ketonisation reactor.

The Fourth Aspect of the Invention

In its fourth aspect of the invention, it relates to the use of ketones obtainable by a method of the invention for the manufacture of base oil components or for intermediate material for production of base oil components.

Base oils may further be used to manufacture products including lubricants, motor oil and metal processing fluids.

The base oil affects many parameters of their endproducts or application such as the viscosity, oxidation stability, volatility, cold flow properties such as pour point, and viscosity index.

Base oils which can be manufactured from ketones obtained according to the present invention fulfil the requirement of Group III of The American Petroleum Institute (API) which divides base oils into five main groups. Groups I to III are petroleum base oil of varying qualities.

TABLE 1

| | API base stock categories | | |
|---|---|---|---|
| Group | Sulfur, wt-% | Saturates, % | Viscosity Index (VI) |
| I | >0.03 | and/or <90 | 80-119 |
| II | ≤0.03 | And ≥90 | 80-119 |
| III | ≤0.03 | And ≥90 | ≥120 |
| IV | Synthetic poly-alpha-olefins (PAOs) | | |
| V | Any other type of base oil than group I-IV | | |

Exemplary embodiments of the invention are now described with reference to the drawings.

FIG. 1 shows a block diagram for a system for producing ketones according to the invention comprising three ketonisation reactors, two gas-liquid separators and a compressor.

Figure 2:
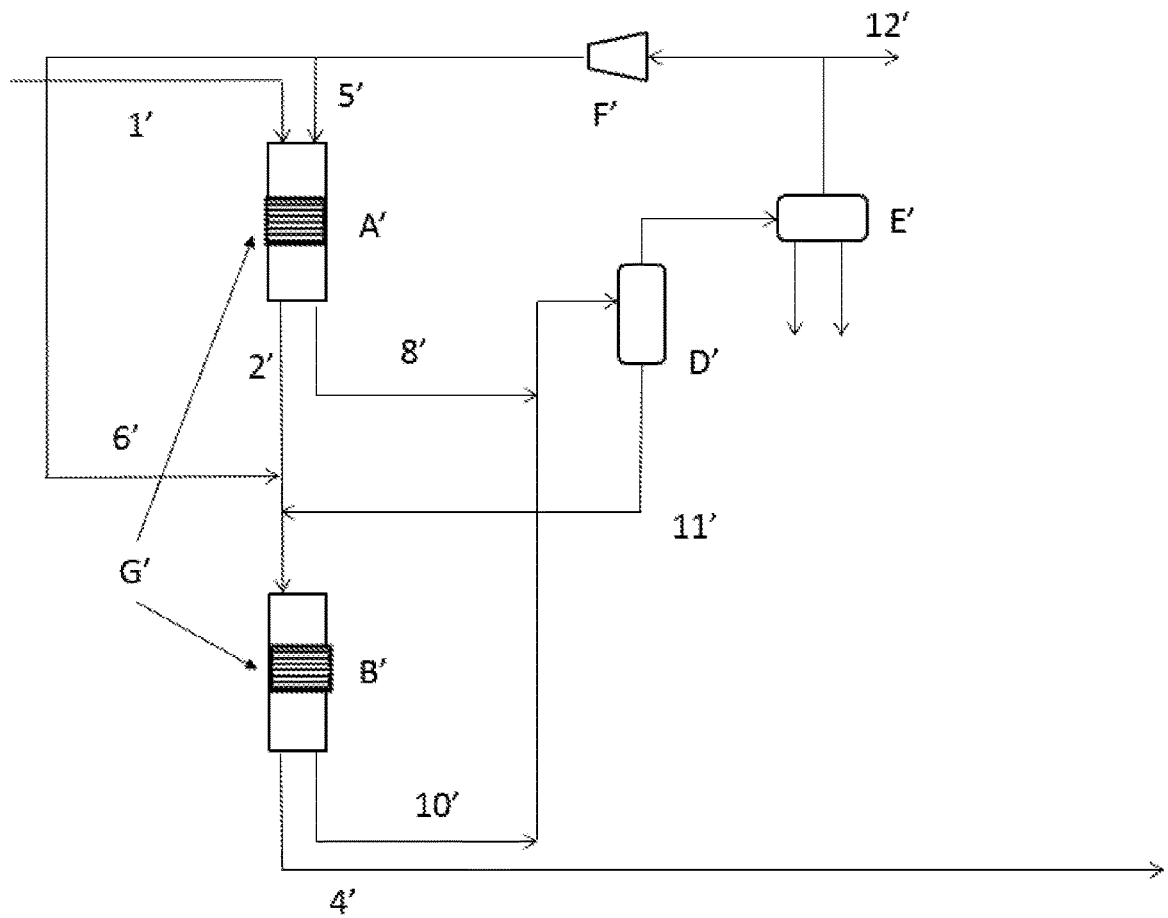
FIG. 2 shows a block diagram for a system for producing ketones according to the invention comprising two ketonisation reactors, two gas-liquid separators and a compressor.

FIG. 2 shows a block diagram for a system for producing ketones according to the invention comprising two ketonisation reactors, two gas-liquid separators and a compressor.

FIG. 1

Equipment:
A Reactor
B Reactor
C Reactor
D Gas-liquid separator
E Gas-liquid separator
F Compressor
G Ketonisation catalyst bed Streams:
1 Fatty acid feedstock to Reactor A
2 Liquid from Reactor A
3 Liquid from Reactor B
4 Liquid from Reactor C
5 CO2 to Reactor A
6 CO2 to Reactor B
7 CO2 to Reactor C
8 Gas from Reactor A
9 Gas from Reactor B
10 Gas from Reactor C
11 Liquid from Gas-liquid separator D
12 Product CO2

A fatty acid feedstock (1), which is at least partly in liquid form, and comprising fatty acids and/or fatty acid derivatives having an average chain length of $C_n$ (n=4 or more) is processed in a ketonisation system wherein the ketonisation reaction is conducted in a catalyst bed system comprising three reactors (A, B, C) in series. The ketonisation catalyst beds (G) include a suitable ketonisation catalyst, such as a Ti containing metal oxide catalyst. The first reactor (A) is loaded with a certain amount of the catalyst, the second reactor (B) is loaded with a higher amount of the catalyst than reactor A, and the third reactor (C) is loaded with a higher amount of catalyst than reactor B.

The reaction temperature is the same, e.g. from 330-365° C., in all reactors (A, B, C). Heating of feedstock 1 and intermediate liquid streams (2, 3) is effectuated with e.g. an oil heater. The inlet pressure in the three reactors (A, B, C) declines as the feed passes the three reactors, so that the pressure in reactor A is higher than the inlet pressure in reactor B, which pressure is again higher than the inlet pressure of reactor C; the inlet pressures are e.g. at least 1000 kPa in the reactors.

The target products of the ketonisation are ketones having an average chain length of $C_{2n-1}$.

The feedstock 1 is led to reactor A by the inlet means and with a suitable liquid feed flow rate. At the same time a flow (5) of $CO_2$ is led as carrier gas to reactor A.

The effluent (2) leaving reactor A comprises ketones produced by the ketonisation reaction and $CO_2$. $CO_2$ is separated from the effluent (2), is recovered and lead as a gas stream (8) to a first gas-liquid separator (D).

The remaining part of effluent 2, free of $CO_2$, is lead to reactor B, and at the same time a flow (6) of $CO_2$ is led as carrier gas to reactor B. The effluent (3) leaving reactor B also comprises ketones produced by the ketonisation reaction and $CO_2$. $CO_2$ is separated from effluent 3 as described for liquid 2, is recovered and lead as a gas stream (9) to the first gas-liquid separator (D).

Finally, the effluent (4) leaving reactor C comprising ketones produced by the ketonisation reaction and $CO_2$ is obtained. $CO_2$ is separated from effluent 4 as described for effluent 2, is recovered and lead as a gas stream (10) to the gas-liquid separator D. Separation of the gas stream 10 from the effluent 4 leaves the target ketones for recover and further treatment.

Each gas stream (8, 9, 10) recovered from the reactors effluents (2, 3, 4) is subjected to cooling and lead to the gas-liquid separator D. The separation in the gas-liquid separator D leaves a gas flow comprising $CO_2$ and $H_2O$ vapor which is lead to a second separator (E). $CO_2$ is recovered in separator E and purified to a substantially pure $CO_2$ stream (12). Thereafter $CO_2$ stream 12 is compressed in a compressor (F) before it is used as carrier gas stream to be used in one of the reactors (A, B, C). Liquid streams from separator E comprised water and a separate minor stream of organic compounds suitable for diesel.

Heat released by cooling of the gas streams (8, 9, 10) is partly utilised for re-heating of compressed $CO_2$.

FIG. 2
Equipment:
A' Reactor
B' Reactor
D' Gas-liquid separator
E' Gas-liquid separator
F' Compressor
G' Catalyst bed
Streams:
1' Fatty acid feedstock to Reactor A'
2' Liquid from Reactor A'
4' Liquid from Reactor B'
5' CO2 to Reactor A'
6' CO2 to Reactor B'
8' Gas from Reactor A'
10' Gas from Reactor 6'11' Liquid from Gas-liquid separator D'
12' Product CO2

A fatty acid feedstock (1'), which is at least partly in liquid form, and comprising fatty acids and/or fatty acid derivatives having an average chain length of $C_n$ (n=4 or more) is processed in a ketonisation system wherein the ketonisation reaction is conducted in a catalyst bed system comprising two reactors (A', B') in series. The ketonisation catalyst beds (G') include a suitable ketonisation catalyst. The first reactor (A') is loaded with a certain amount of catalyst, and the second reactor (B') is loaded with a higher amount of catalyst than reactor A'.

The reaction temperature is the same, e.g. from 330-365° C., in both reactors (A', B'). Heating of the feedstock 1 and the intermediate liquid stream (2') is effectuated with e.g. an oil heater. The inlet pressure in the reactors (A', B') declines as the feed passes the two reactors, so that the pressure in reactor A' is higher than the inlet pressure in reactor B'; the inlet pressures are e.g. at least 1000 kPa in the reactors.

The target products of the ketonisation are ketones having an average chain length of $C_{2n-1}$.

The fatty acid feedstock 1' is led to reactor A' by the inlet means and with a suitable liquid feed flow rate. At the same time a flow (4) of $CO_2$ is led as carrier gas to reactor A'.

The effluent (2') leaving reactor A' comprises ketones produced by the ketonisation reaction and $CO_2$. $CO_2$ is separated from effluent 2', is recovered and lead as a gas stream (8') to a first gas-liquid separator (D').

The remaining part of effluent 2', free of $CO_2$, is lead to reactor B', and at the same time a flow (6') of $CO_2$ is led as carrier gas to reactor B'. The effluent (4') leaving reactor B' also comprises ketones produced by the ketonisation reaction and $CO_2$. $CO_2$ is separated from effluent 4' as described for liquid 2', is recovered and lead as a gas stream (10') to gas-liquid separator D'. Separation of the gas stream (10') from effluent 4' leaves the target ketones for recover and further treatment.

Each gas stream (8', 10') recovered from the reactor effluents (2', 4') are subjected to cooling and lead to the gas-liquid separator D'. The separation in gas-liquid separator D' leaves a gas flow comprising $CO_2$ and $H_2O$ which is lead to a second separator (E'). $CO_2$ is recovered in separator E' and purified to a substantially pure $CO_2$ stream (12'). Thereafter the $CO_2$ stream 12' is compressed in the compressor (F') before it is used as carrier gas stream to be used in one of the reactors (A', B').

Heat released by cooling of the gas streams (8, 10') is partly utilised for re-heating of compressed $CO_2$.

EXAMPLES

Example 1 (FIG. 1)

Pure $C_{16}$ fraction of palmitic acid was used as feedstock in a design wherein the reaction was conducted in a trickle bed system comprising three reactors (A, B, C) in series. The ketonisation catalyst beds (G) included a $K_2O/TiO_2$ catalyst; loaded as 13,000 kg in the first reactor, 14,000 kg in the second reactor, and 22,000 kg in the third reactor.

The target product of the ketonisation of $C_{16}$ acids is $C_{31}$-ketones.

The feed temperature was 350° C. in all reactors (A, B, C). The inlet pressure in the three reactors was 1700 kPa in the first reactor (A), 1500 kPa in the second reactor (B), and 1300 kPa in the third reactor (C).

The palmitic acid feedstock (1) was led to the first reactor (A) by the inlet means.

The liquid feed flow rate was 20,000 kg/h. The $CO_2$ flow (5, 6, 7) was 15,000 kg/h.

The normal boiling point of palmitic acid is around 351° C., and 1000 kPa was considered as the minimum process pressure.

$CO_2$ was used as carrier gas and was led to each of the reactors (A, B, C) as the inlet carrier gas streams (5, 6, 7). The $CO_2$ produced by the ketonisation reaction in each reactor was separated from the effluents from each reactor (2, 3, 4) and recovered and led as the gas streams (8, 9, 10) to the gas-liquid separators (D, E). In the first separator (D) $CO_2$ and $H_2O$ vapors were separated from liquid organics carried over, mainly unreacted feedstock, and the liquid separated in this separator (11) was recycled to the third reactor (C). The gas stream from separator D was led to a second separator (E) wherein $CO_2$ was recovered and purified to a substantially pure $CO_2$ stream and compressed in the compressor (F) before it was used as carrier gas stream to be used in each of the reactors (A, B, C). Liquid streams from separator E comprised water and a separate minor stream of organic compounds suitable for diesel. The major part of pure $CO_2$ exiting separator E was lead to a compressor, whereas a part of $CO_2$ (equal to the amount produced as side product of ketonisation) is cleaved to a substantially pure $CO_2$ product.

The feedstock (1) and intermediate liquid streams (2, 3) were heated to the operating temperature of 350° C. with an oil heater. The gas streams (8, 9, 10) were subjected to cooling to 272° C. prior to the separation in the first separator (D), and the released heat is partly utilised for re-heating of the compressed $CO_2$. Additional heating and cooling was also required for these streams, implemented as an air cooler operating at 200° C. for additional cooling of the gas streams. For the further cooling between the two separators (D, E), a water cooler operating at 40° C. was used.

Example 2

Yield and Mass Flow

The ketonisation reaction provided $C_{31}$ in a high yield and with high selectivity. Results are shown in Table 2.

TABLE 2

| Yield and mass flow | |
|---|---|
| Liquid product | |
| Molar conversion of feedstock fatty acids | 99% |
| Molar selectivity to C31 ketone | 93% |
| Weight based yield of C31 ketone from palmitic acid (theor. 87.9%) | 82% (93% out of theoretical yield) |
| Weight based yield of base oil precursors (C31 ketone, other ketones, heavies) | 85% |
| Weight based yield of diesel precursors from palmitic acid | 2% |
| Mass fraction of heavies in base oil precursors | 3.8% |
| Total mass flow of base oil precursors kg/h | 17,040 |
| $CO_2$ product, split from the recycling | |
| Mass flow kg/h (12) | 1,710 |
| Purity of $CO_2$ | 99.99% |
| Organic side stream from the second separator (E) | |
| Mass flow kg/h | 190 |
| Weight fraction of diesel precursors | 92% |
| Waste water from the second separator (E) | |
| Mass flow kg/h | 690 |
| Purity of water | 100% |

The results show that the ketonisation process can be implemented with a high yield of the target ketone. The present example includes three trickle-bed-reactors in series, the stripping of water and the re-heating of the liquid intermediate product stream after reactors A and B. The total base oil precursor yield is 85 weight % out of the theoretical 87.9%. The only side products are a minor amount of diesel precursors, water and $CO_2$. The base case assumes 20,000 kg/h feedstock when operating with the temperature of 350° C. and feedstock pressure of 1800 kPa. $CO_2$ is used as a carrier gas in the process, recycled, and the amount generated by ketonisation can be recovered in 99.99% purity and considered as another product (1710 kg/h). The total amount of $CO_2$ flow rate is 15,000 kg/h.

Energy Consumption:

Table 3 provides data for the heat exchangers, the pumps and the compressor. The cooling of the reactor gas effluent (−686 kW) provides a part of the heat required for the $CO_2$ reheating (686 kW) in an integrated exchanger.

TABLE 3

| Heat exchangers | |
|---|---|
| Fatty acid feed heater (to heat the feedstock from 100° C. to 350° C.) | 4257 kW |
| Heater for liquid product from Reactor A | 130 kW |
| Heater for liquid product from Reactor B | 522 kW |
| Exchanger for reactor gas phase effluent (5, 6, 7) | −686 kW |
| Exchanger for heating of recycled $CO_2$ (12) | 686 kW |
| Air cooler for additional cooling of reactor gas stream (5, 6, 7) | −692 kW |
| Electric heater for additional heating of recycled $CO_2$ stream | 838 kW |
| Water cooler for gas effluent of gas-liquid separator (D, E) | −1222 kW |
| Pumps | |
| Liquid product pump (discharge pressure 4500 kPa for HDO) | 25.3 kW |
| Pump for returning un-reacted feedstock to Reactor C (11) | 1.3 kW |
| Compressor | |
| For re-pressurizing $CO_2$ (F) | 154 kW |

Example 3

Table 4 shows the ranges of other key ketonisation parameters

TABLE 4

| Process variable | Min. | Max. |
|---|---|---|
| $CO_2$ flow (kg/h) | as low as still effective | 15,000 |
| Temperature (° C.) | 330 | 360 |
| Pressure (kPa) | 1000 | 2500 |
| WHSV (1/h) | 0.2 | as high as possible |

Example 4

The inventors also tested appropriate catalyst loadings for a fresh catalyst for the feed temperatures 340, 345 and 350° C. for reaching an acceptable base case performance. The conditions tested are indicated in table 5. The feed temperature/catalyst loading combinations leading to a high, viz. >83 wt.-% out of theoretical 87.9 wt.-%, base oil precursor yield is indicated.

TABLE 5

| $T_{feedstock}$ | Loading of reactor A | Loading of reactor B | Loading of reactor C | Effective WHSV (1/h) |
|---|---|---|---|---|
| 340° C. | 20,000 kg | 22,000 kg | 33,000 kg | 0.27 |
| 345° C. | 16,000 kg | 17,000 kg | 25,000 kg | 0.34 |
| 350° C. | 13,000 kg | 14,000 kg | 22,000 kg | 0.41 |
| 355° C. | 11,000 kg | 12,000 kg | 18,000 kg | 0.49 |
| 360° C. | 8,000 kg | 9,000 kg | 15,000 kg | 0.63 |

If the system works at 340° C. or below, it may be advantageous to use four reactors instead of three.

Example 5 (FIG. 2)

The number of required reactors depends on the production capacity and the target yields. For the base case operation, 3-reactor-process configuration is optimal. For smaller production capacities a 2-reactor-process configuration, displayed in FIG. 2, is sufficient for providing a good ketone yield. The adiabatic temperature drop in the reactors is limited to ten degrees of centigrade, which determines the reactor sizing i.e. catalyst loadings. Qualitatively the operations are equivalent to those described in example 1.

The invention claimed is:

1. A method for producing ketones, suitable for manufacture of base oil or diesel fuel components, from a feedstock of biological origin containing fatty acids or fatty acid derivatives, wherein the feedstock is at least partly in liquid phase, the method comprising:
   introducing the feedstock into a ketonisation reactor together with a carrier gas stream containing $CO_2$;
   subjecting the feedstock to a catalytic ketonisation reaction, wherein the ketonisation reaction is carried out in a system having one or more ketonisation reactor(s) each with at least one ketonisation catalyst bed;
   separating gas containing $CO_2$ from an effluent exiting a ketonisation reactor whereby the effluent containing ketones is used either as a feedstock for a further ketonisation reactor or for recovery of ketones from the effluent; and
   recycling the separated gas containing $CO_2$ for use in the carrier gas stream in a ketonisation reactor.

2. Method according to claim 1, wherein the feedstock is at least 60 wt-% in liquid phase.

3. Method according to claim 1, wherein the feedstock of biological origin comprises:
   at least one of saturated free fatty acids, saturated fatty acid esters, esters, amides, aldehydes, alcohols, anhydrides, metal salts, or mixture thereof, or fatty acid glycerols.

4. Method according to claim 1, wherein the feedstock of biological origin comprises:
   at least one of saturated free fatty acids, saturated fatty acid esters having an average carbon chain length of from $C_4$ to $C_{24}$, or saturated fatty acid esters having an average carbon chain length of from $C_6$ to $C_{24}$.

5. Method according to claim 1, wherein the catalyst bed comprises:
   a ketonisation catalyst which is a metal oxide catalyst selected from a list consisting of one or more of: Ti, Mn, Mg, Ca, and Zr containing metal oxide catalyst.

6. Method according to claim 1, wherein a temperature in the feedstock is at least 330° C.

7. Method according claim 6, wherein the temperature is 365° C. or less.

8. Method according to claim 7, wherein a pressure in a ketonisation reactor is as least 1000 kPa.

9. Method according to claim 1, wherein the liquid feed flow rate, WHSV, is from 0.1 to $10^{-1}$.

10. A method according to claim 1, wherein the ketonisation reaction is carried out in a system having two or more ketonisation reactors in series each with a ketonisation catalyst bed, the method comprising:
    introducing the feedstock into the first ketonisation reactor together with a first carrier gas stream containing $CO_2$; and
    separating the gas containing $CO_2$ from the effluent exiting the first ketonisation reactor whereby the effluent is introduced into the second ketonisation reactor together with a second carrier gas stream containing $CO_2$; and if the system includes more than two ketonisation reactors:
    separating the gas containing $CO_2$ from the effluent exiting each ketonisation reactor leaving a degassed effluent which is subsequently introduced into a next ketonisation reactor together with a further carrier gas stream containing $CO_2$;
    separating gas containing $CO_2$ from effluent exiting a final ketonisation reactor whereby the effluent containing ketones is used for recovery; and
    recycling the separated gas streams containing $CO_2$ for use as the carrier gas stream in one or more of the ketonisation reactor(s).

11. Method according to claim 10, wherein a pressure in each ketonisation reactor in series following the first ketonisation reactor is lower than a pressure in a preceding ketonisation reactor.

12. Method according to claim 10, wherein a catalyst loading in the catalyst bed in each ketonisation reactor in series following the first ketonisation reactor is higher than a catalyst loading in a first ketonisation reactor by at least 10% higher in the second reactor or at least 50% higher in a third reactor.

13. Method according to claim 1, wherein the system includes at least two ketonisation reactors.

14. Method according to claim 13, comprising:
    heating the effluent exiting a ketonisation reactor and separated from gas containing $CO_2$ before introduction into a subsequent ketonisation reactor.

15. Method according to claim 1, comprising:
purifying the separated gas streams containing $CO_2$ before recycling; and
recovering the separated gas steams in a separation process by:
separating $CO_2$ and $H_2O$ vapour from unreacted fatty acids and volatile organic compounds or separating substantially pure $CO_2$, which is at least 98% pure, from the waste water; and
optionally recycling unreacted fatty acids or fatty acid derivatives to a ketonisation reactor.

16. Method according to claim 15, comprising:
purifying the separated gas containing $CO_2$ by cooling, and optionally further purification
drying recovered purified gas before recycling to a ketonisation reactor.

17. Method according to claim 15, comprising:
recovering and compressing substantially pure $CO_2$, optionally under heating, before being recycled to a ketonisation reactor.

18. Method according to claim 16, wherein heat generated by the cooling is used for compression under heating of the substantially pure $CO_2$.

19. Method according to claim 1, comprising:
a hydrodeoxygenation, optional isomerization, and optional hydrofinishing.

20. A system for producing ketones, suitable for manufacture of base oil components, from a feedstock of biological origin containing fatty acids or fatty acid derivatives by subjecting the feedstock to a catalytic ketonisation reaction, wherein the system comprises:
one or more ketonisation reactors (A', B') each having a ketonisation catalyst bed (G'), means for heating, inlet means for the feedstock, and outlet means for the effluent exiting a ketonisation reactor, wherein the one or more ketonisation reactors each includes:
inlet means for carrier gas streams, and outlet means for separated gas streams containing $CO_2$; and wherein the system comprises:
one or more gas-liquid separators (D', E') for separating $CO_2$ in separated gas streams from $H_2O$ vapour, unreacted fatty acids or fatty acid derivatives, or volatile organic compounds, and means (F') for recirculating and optionally compressing the separated $CO_2$; and optionally
recycling means for liquid containing unreacted fatty acids or fatty acid derivatives, and outlet means for separated $CO_2$.

21. System according to claim 20, comprising:
means for purifying separated $CO_2$ to a substantially pure $CO_2$ gas, which is at least 98% pure.

22. System according to claim 20, comprising:
two, three or four ketonisation reactors, in series.

23. System according to claim 20, comprising:
three ketonisation reactors (A, B, C), in series, each having a ketonisation catalyst bed (G), means for heating, inlet means for the feedstock, and outlet means for effluent exiting a ketonisation reactor; wherein the three ketonisation reactors each include:
inlet means for a carrier gas stream, and outlet means for separated gas streams containing $CO_2$; and wherein the system includes:
one or more gas-liquid separators (D, E) for separating $CO_2$ in separated gas streams from $H_2O$ vapour, unreacted fatty acids or fatty acid derivatives, or volatile organic compounds, and means (F) for recirculating and optionally compressing the separated $CO_2$; and optionally
recycling means for liquid containing unreacted fatty acids or fatty avid derivatives, and outlet means for separated $CO_2$.

24. System according to claim 20, wherein the one or more ketonisation reactors is a trickle bed reactor.

25. System according to claim 20, comprising:
means for purification of gas containing $CO_2$, including means for separating $CO_2$ and/$H_2O$ vapour from volatile organic compounds.

26. Method for supplying a gas containing $CO_2$ as a carrier gas stream in a ketonisation reaction, the method comprising:
producing the gas containing $CO_2$ in a catalytic ketonisation reaction producing ketones, suitable for manufacture of base oil components, from a feedstock of biological origin containing fatty acids or fatty acid derivatives, wherein the feedstock is at least partly in liquid phase, in one or more ketonisation reactors each having a ketonisation catalyst bed; and
separating the gas from effluent exiting a ketonisation reactor and recycling the gas.

27. Method according to claim 26 for enhancing the gas flow within a ketonisation reactor having a ketonisation catalyst bed, comprising:
subjecting a feedstock of biological origin containing fatty acids or fatty acid derivatives to a ketonisation reaction.

28. Method according to claim 26, comprising:
purifying and recovering the separated gas containing $CO_2$ before recycling in a separation process by separating $CO_2$ from $H_2O$ vapour or volatile organic compounds; and
optionally separating the $CO_2$ as substantially pure $CO_2$ from the waste water.

29. Method according to claim 28, comprising:
cooling the separated gas containing $CO_2$ before purification; or
drying the recovered purified gas before recycling to a ketonisation reactor.

30. Method according to claim 26, comprising:
purifying and recovering substantially pure $CO_2$, optionally under heating, before being recycled to a ketonisation reactor.

31. Method for the manufacture of base oil or base oil components, the method comprising:
producing ketones according to claim 1; and
manufacturing a base oil or base oil components with the ketones.

32. Method according to claim 1, wherein the feedstock is selected to be at least one of 65 wt-%, at least 70 wt-%, at least 75 wt-%, at least 80 wt-%, or at least 90 wt-% in liquid phase, or 100 wt-% in liquid phase.

* * * * *